G. G. BLACK.
Cultivator.
No. 17,777. Patented July 14, 1857.
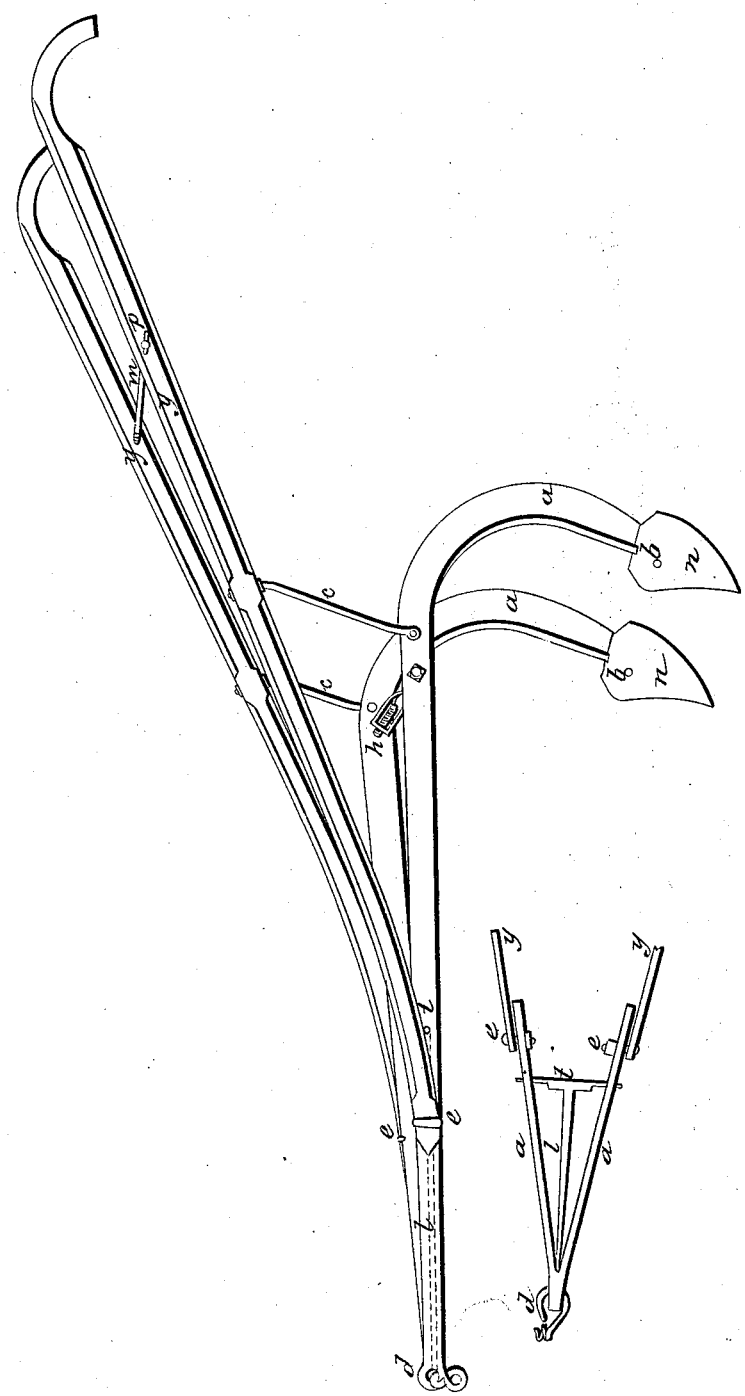

UNITED STATES PATENT OFFICE.

GEO. G. BLACK, OF CROSSINVILLE, OHIO.

IMPROVEMENT IN CULTIVATOR-PLOWS.

Specification forming part of Letters Patent No. 17,777, dated July 14, 1857.

*To all whom it may concern:*

Be it known that I, GEORGE G. BLACK, of the town of Crossinville, in the county of Perry and State of Ohio, have invented a new and Improved Double-Shovel Plow; and I do hereby declare that the following is a full and exact description thereof, reference being had to the accompanying drawing and the letters of reference marked thereon.

The nature of my invention and improvements in double plows with two beams joined at the clevis and made to be adjusted to rows of crops of different widths consists in the arrangement of a rod between the beams, to prevent the horse or animal drawing the plows from getting his foot or leg wedged in between the beams of the plow, said rod being provided with a cross-bar to support it, upon which the beams vibrate when the width or space between the plows is changed.

In the accompanying drawing, $a\ a$ are the beams, joined together at the clevis $d$, and also joined to the rod $l$, placed between them, to prevent the animals which draw the plow from getting their legs or feet wedged in between the beams. The rear end of this rod $l$ is supported by the cross-bar $t$, which is fastened to it, with its ends passing through the beams $a\ a$, which traverse upon it when the distance between the beams is changed by the link-screw $h$, arranged between the beams, as represented, to set and adjust the plows a proper distance apart to suit the rows of crops being cultivated. The beams $a\ a$ are bent toward their rear ends, and have the shovels or scrapers $n\ n$ fastened to them by the bolts $b\ b$, as shown in the drawing, which shovels may be made in such form as will adapt them to the crops or ground to be cultivated. The fore end of the handles $y\ y$ are fastened to the beams by bolts $e\ e$, and they are supported by the braces $c\ c$, which connect them to the rear of the beams, as shown in the drawing. These handles are adjusted the required distance apart by the bar $m$, which has a shoulder and pivot at one end, which is secured to the handle, so as to turn freely in it, by the pin $p$. The opposite end of the bar has a male screw on it fitted to a female screw in the handle, so that by turning the bar $m$ the handles are traversed and set nearer together or farther apart, as desired. By turning the link-screw $h$ and the bar $m$ the scrapers $n\ n$ may be adjusted to throw the required quantity of earth about the growing crop being cultivated, the beams traversing on the rod $t$, as before mentioned.

I believe I have described and represented my improvements in double plows so as to enable any person skilled in the art to make and use them. I will now state what I desire to secure by Letters Patent, to wit:

What I claim as my invention in double plows with two beams joined at the clevis and made to be adjusted to rows of crops of different widths is—

The rod $l$, arranged between the beams and provided with a cross-bar, $t$, upon which the beams can vibrate when the plows are adjusted, as described.

GEORGE G. BLACK.

Witnesses:
ALFRED McVEIGH,
JESSE McVEIGH.